United States Patent [19]

Inoue et al.

[11] Patent Number: 5,677,253
[45] Date of Patent: Oct. 14, 1997

[54] WAFER HOLDING MEMBER

[75] Inventors: Hironori Inoue; Kazuhiro Kuchimachi; Yasunori Kawanabe; Saburo Nagano; Akihiro Kukita, all of Kokubu, Japan

[73] Assignee: Kyocera Corporation, Kyoto, Japan

[21] Appl. No.: 600,890

[22] Filed: Feb. 13, 1996

[30] Foreign Application Priority Data

| Mar. 30, 1995 | [JP] | Japan | 7-073278 |
| Sep. 28, 1995 | [JP] | Japan | 7-250728 |

[51] Int. Cl.$^6$ ............................................. C04B 35/581
[52] U.S. Cl. .............................................................. 501/98
[58] Field of Search ................................................ 501/98

[56] References Cited

U.S. PATENT DOCUMENTS

| 4,833,108 | 5/1989 | Mizuno et al. | 501/89 |
| 5,077,245 | 12/1991 | Miyahara | 501/98 |
| 5,124,284 | 6/1992 | Ishida et al. | 501/98 |
| 5,147,832 | 9/1992 | Shimoda et al. | 501/98 |
| 5,219,803 | 6/1993 | Yamakawa et al. | 501/98 |
| 5,376,601 | 12/1994 | Okawa et al. | 501/98 |
| 5,508,240 | 4/1996 | Komatsu et al. | 501/98 |

*Primary Examiner*—Karl Group
*Attorney, Agent, or Firm*—Loeb & Loeb LLP

[57] ABSTRACT

Disclosure relates to the method for improving the heat absorption characteristic of a wafer holding member made of aluminum nitride during indirect heating and the method for preventing electrostatic adhesion. To establish the former method, the wafer holding member comprises an aluminum nitride based sintered body containing $Er_2O_3$ as a sintering aid and silicon in the range of more than 200 ppm to 500 ppm or less and having a thermal conductivity of 150 W/m.k or more, and further comprises a holding base body made of an aluminum nitride based sintered body.

5 Claims, 5 Drawing Sheets

WAFER HOLDING MEMBER

BACKGROUND OF THE INVENTION

1. Field of the Invention

The present invention relates to the improvements in a wafer holding member, for example, a susceptor for holding a wafer, such as a semiconductor wafer and a glass substrate wafer for liquid crystal display, more particularly to the method for improving the heat absorption characteristic of the wafer holding member during indirect heating and the method for preventing electrostatic adhesion.

2. Prior Art

Conventionally, in a process of forming a membrane thin film on the surface of a semiconductor wafer, a glass substrate wafer for LCD or the like, the wafer is disposed on the top surface of a disc-shaped susceptor and heated indirectly from downward by halogen lamps.

In addition, to form an accurate film on the wafer, it is necessary to uniformly heat the wafer. Therefore, the susceptor is sometimes made of aluminum having high thermal conductivity.

However, in the above-mentioned susceptor made of aluminum, the positional accuracy of the wafer cannot be maintained as the temperature 6f processing rises because of excessive difference in thermal expansion coefficient between the wafer and the susceptor, causing the problem of impairing the accuracy of film forming.

To solve this problem, a susceptor made of a silicon carbide based sintered body having a thermal expansion coefficient approximate to that of the wafer ($4.2 \times 10^{-6}$/°C.) and having thermal conductivity higher than those of many other ceramics has been proposed.

However, since a halogenated gas, such as $ClF_3$, $NF_3$, $CF_4$ or HF, is used as an atmosphere gas, the susceptor made of the above-mentioned silicon carbide based sintered body is etched by the halogenated gas, thereby causing the problem of short service life. Furthermore, since the thermal conductivity of the silicon carbide based sintered body is about 71 W/m.k at most, the thermal conductivity is too low to uniformly heat the wafer, causing the fear of adversely affecting the accuracy of film forming on the wafer.

On the other hand, these days, an aluminum nitride based sintered body is known as a ceramic having thermal conductivity higher than that of the silicon carbide based sintered body and being difficult to be etched by a halogenated gas, and a susceptor made of an aluminum nitride based sintered body has been proposed (refer to Japanese Laid-open Patent Application No. 5-251365).

However, since the aluminum nitride based sintered body is generally milky-white, almost all the light of wavelengths emitted from halogen lamps is reflected, resulting in a very low absorption ratio of the light of wavelengths and causing the problem of incapable of heating a wafer to a temperature necessary for film forming.

The above-mentioned problems relate to the heat absorption characteristic of the conventional wafer holding member made of an aluminum nitride based sintered body during indirect heating.

In the production process of semiconductor devices, on the other hand, plasma etching is performed on a semiconductor wafer made of silicon or the like. At this time, the wafer is placed on the susceptor and pressed at the edges thereof and held by a clamp ring.

The susceptor and the clamp ring are required to have resistance against heat and corrosion, and conventionally made of alumina ceramics. However, since alumina ceramics are apt to be etched by plasma, $Al_2O_3$ grains are removed to form particles, causing the problem of adversely affecting wiring on the wafer.

To solve this problem, the method for using an aluminum nitride based sintered body having high plasma resistance and high thermal conductivity as the above-mentioned wafer holding member has been proposed (refer to Japanese Laid-open Patent Application No. 5-251365).

However, the above-mentioned aluminum nitride based sintered body is apt to generate static electricity and has the disadvantage of adhering to the semiconductor wafer because of the generated static electricity. If the clamp ring and the susceptor are made of aluminum nitride based sintered bodies, an operation of mechanically separating the semiconductor wafer therefrom is necessary after the completion of the process, causing the problem of lowering the capability of wafer processing and the problem of increasing impurities in the wafer during the separation operation.

These problems are caused by the fact that the volume resistivity of the aluminum nitride based sintered body, $10^{12}$ to $10^{14} \Omega \cdot cm$, is lower than that of ordinary alumina ceramics, $10^{15}$ to $10^{17} \Omega \cdot cm$, at room temperature. More specifically, when the above-mentioned aluminum nitride based sintered body is heated during plasma processing, the volume resistivity thereof is lowered to $10^{13} \Omega \cdot cm$ or less, charges are generated by a minute current, and electrostatic adhesion force referred to as "Johnsen-Rahbeck's force" is generated, thereby causing the sintered body to adhere to the semiconductor wafer.

The above-mentioned problems are caused by the static electricity on the wafer holding member made of the aluminum nitride based sintered body.

SUMMARY OF THE INVENTION

The first object of the present invention is to improve the heat absorption characteristic of a wafer holding member during indirect heating and the second object is to prevent adhesion because of static electricity.

The present invention has the above-mentioned two objects and essentially adopts two solutions to attain the first object and one solution to attain the second object.

In the disclosure described below, these solutions are referred to as first, second and third inventions respectively.

In accordance with the first invention, the wafer holding member, such as a susceptor, is made of a blackened aluminum nitride based sintered body so that the absorption characteristic of the light of wavelengths (200 to 2000 nm) emitted from halogen lamps can be raised, so that the wafer can be heated efficiently to a predetermined temperature and so that absorbed heat can be transferred to the whole of the wafer holding member to uniformly heat the wafer. Furthermore, the first invention provides the wafer holding member hardly etched by a halogenated gas and having a long service life.

In accordance with the second invention, a new heat absorbing layer is embedded inside a portion which is 10 to 1000 μm thick from the light absorbing surface of the wafer holding member so that the wafer holding member can have a high light absorption ratio, and consequently the wafer can be heated uniformly to the predetermined temperature by uniformly transferring absorbed heat to the whole of the wafer holding member. Furthermore, the second invention provides the wafer holding member which is hardly etched and does not contaminate the wafer.

In accordance with the third invention, the portion of the wafer holding member made of an aluminum nitride based sintered body and making contact with the wafer is provided with a high resistance layer having volume resistivity higher than that of an aluminum nitride based sintered body used as a base material so that the wafer holding member not causing electrostatic adhesion can be provided.

The above-mentioned resistance layer made of a material having a volume resistivity of $10^{13}$ Ω·cm or more during usage may be coated on the wafer holding member as a film, or may be attached firmly thereto as another independent member. Furthermore, an alumina film formed by oxidizing the surface of the aluminum nitride based sintered body may also be used.

BRIEF DESCRIPTION OF THE DRAWINGS

The first, second and third inventions will be described below in detail referring to the drawings of preferred embodiments.

To facilitate the understanding of the disclosure described below, the relationship among the first to third inventions and related claims and drawings is shown in the table below.

|  | Claims | Drawings |
| --- | --- | --- |
| First invention | 1–5 | 1–3 |
| Second invention | 6–11 | 4–5 |
| Third invention | 12–15 | 6–7 |

DETAILED DESCRIPTION OF THE INVENTION

The first invention is intended to provide a wafer holding member, such as a susceptor, which is made of a blackened aluminum nitride based sintered body so that the absorption characteristic of the light of wavelengths (200 to 2000 nm) emitted from halogen lamps can be raised, so that the wafer can be heated efficiently to a predetermined temperature, so that absorbed heat can be transferred to the whole of the wafer holding member to uniformly heat the wafer and so that the wafer holding member is hardly etched by a halogenated gas and has a long service life. To attain the object, the first invention relates to a wafer holding member comprising an aluminum nitride based sintered body containing $Er_2O_3$ as a sintering aid and silicon in the range of more than 200 ppm to 500 ppm or less and having a thermal conductivity of 150 W/m.k or more.

Although an aluminum nitride based sintered body containing $Er_2O_3$ is essentially pink in color, the inventors of the first invention have found that the above-mentioned aluminum nitride based sintered body can be made black (black purple to black) when silicon is added to the aluminum nitride based sintered body, and the first invention is intended to obtain the wafer holding member made of the blackened aluminum nitride based sintered body.

With this wafer holding member, therefore, the light of wavelengths of 200 to 2000 nm emitted from halogen lamps can be absorbed at a high ratio, and the wafer can be heated to a temperature required for film forming. Furthermore, since silicon included in the aluminum nitride based sintered body is the same element as the material constituting a semiconductor wafer and a glass substrate for LCD, the wafer is not adversely affected.

Moreover, the wafer must be heated uniformly to perform accurate film forming on the surface of the wafer. For this purpose, the thermal conductivity of the wafer holding member is required to be 150 W/m.k or more.

Figure 1:
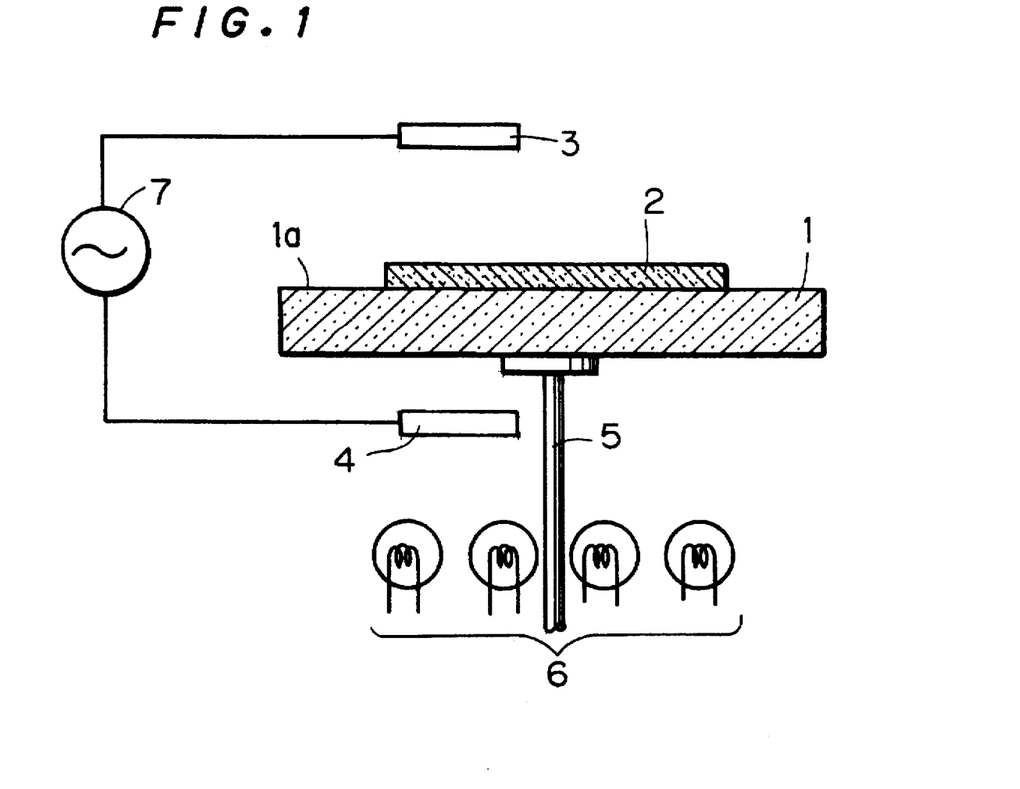
FIG. 1 is an explanatory view showing the method for forming a membrane thin film on a semiconductor wafer by using a susceptor in accordance with an embodiment of the wafer holding member of the first invention.

More specific descriptions will be given below. As shown in FIG. 1, since a wafer holding member 1 supported by a support base 5 is heated by a group of halogen lamps 6, the light of wavelengths from the halogen lamps 6 cannot be absorbed from the portion making contact with the support base 5 and from the shadow formed by the support base 5. Therefore, when the thermal conductivity of the wafer holding member 1 is less than 150 mW/m.k, the heat absorbed from other surfaces cannot be transferred smoothly and the whole of the wafer holding member 1 cannot be heated uniformly. If an attempt is made to form a film on a semiconductor wafer by using the wafer holding member 1 of such thermal conductivity, the film 2 on the surface of the semiconductor wafer is made thinner at the portion making contact with the support base 5 and at the portion corresponding to the shadow formed by the support base 5, and consequently no uniform film can be formed.

In addition, in order to obtain the wafer holding member having a thermal conductivity within the above-mentioned range, the content of $Er_2O_3$ contained as a sintering aid in the aluminum nitride based sintered body is desired to be 5 weight % or more. This is because the thermal conductivity of the aluminum nitride based sintered body is determined by the content of $Er_2O_3$ contained as a sintering aid. If the content of $Er_2O_3$ is less than 5 weight %, the thermal conductivity of the wafer holding member cannot be raised to 150 W/m.k or more because of the excessively small amount of $Er_2O_3$, and there are tendencies that the heat absorbed from the halogen lamps cannot be transferred to the whole of the wafer holding member and that the wafer cannot be heated uniformly. However, if the content of $Er_2O_3$ is more than 9 weight %, although the thermal conductivity of the wafer holding member can be raised to 150 W/m.k or more, there is a fear that the sintered body is etched by a halogenated gas because of an excessive amount of $Er_2O_3$.

For this reason, it is desired that the content of $Er_2O_3$ in the aluminum nitride based sintered body constituting the wafer holding member is in the range of 5 to 9 weight %.

In addition, in order to absorb the light of wavelengths of 200 to 2000 nm emitted from the halogen lamps and efficiently heat the wafer to the predetermined temperature, the absorption ratio of the light of wavelengths within the above-mentioned range should preferably be 60% or more. To attain this purpose, it is important that the lightness of the blackened aluminum nitride based sintered body is 50 or less.

Lightness is defined herein as a value measured with a colorimeter under the irradiation by standard light C as a light source (JIS Z 8729). If the lightness is more than 50, since the aluminum nitride based sintered body cannot be blackened sufficiently, the absorption ratio of part of the light of wavelengths of 200 to 2000 nm becomes 60% or less, and it is difficult to efficiently heat the wafer to the predetermined temperature.

Furthermore, in order to obtain a lightness value of 50 or less by sufficiently blackening the aluminum nitride based sintered body, the content of silicon in the sintered body becomes an important factor.

In other words, if the content of silicon is 200 ppm or less, the sintered the body cannot be blackened sufficiently and the lightness cannot be lowered to 50 or less. As a result, it is difficult to raise the absorption ratio of the light of wavelengths of 200 to 2000 nm emitted from the halogen lamps to 60% or more. When the content of silicon is more than 500 ppm, the lightness can be lowered to 50 or less. However, this is undesirable since the thermal conductivity of the aluminum nitride based sintered body significantly drops to less than 150 W/m.k. In addition, since silicon is apt to react with a halogenated gas used as an atmosphere gas, when the content is more than 500 ppm, the silicon deposited on the grain boundary phase reacts with the halogenated gas, and there is a fear of accelerating etching.

It is therefore necessary that the appropriate content of silicon in the aluminum nitride based sintered body should be in the range of more than 200 ppm to 500 ppm or less.

Mo, W, etc. can be added as coloring agents to further blacken the aluminum nitride based sintered body and to increase the light absorption ratio. However, if the amount of the coloring agents exceeds 50 ppm, the thermal conductivity of the aluminum nitride based sintered body drops. It is therefore necessary that the amount of the coloring agents should be 50 ppm or less.

Furthermore, although the aluminum nitride based sintered body can include CaO, MgO, etc. as impurities, it is desirable that the amount of the impurities should be 1 weight % or less of the whole weight of the sintered body. This is because, just as in the case of silicon, CaO and MgO are apt to react with a halogenated gas used as an atmosphere gas. If the content is more than 1 weight %, the aluminum nitride based sintered body is etched acceleratedly.

In addition, to produce the wafer holding member made of the above-mentioned aluminum nitride based sintered body, AlN powder having a purity of 99% or more, an average particle diameter of 3 μm or less, preferably about 1.5 μm, and a silicon content of 100 ppm or less is mixed with $ER_2O_3$ as a sintering aid at a weight ratio of 91:9 to 95:5. Furthermore, a solvent is added to the mixture and the mixture is crushed by $Si_3N_4$ balls. At this time, $Si_3N_4$ is mixed into the material, since the balls are worn. By adjusting the time of crushing, however, the content of silicon can be adjusted in the range of more than 200 to 500 ppm or less. To more blacken the sintered body, Mo and W may be included within the range up to 50 ppm as coloring agents.

Next, a binder is added to and mixed with the above-mentioned material to form slurry and tape is formed by using the doctor-blade process. After the lamination of the tape is made, the lamination is machined to form a predetermined shape. Alternatively, the slurry is dried by a spray drier to form granules. The granules are charged into a predetermined mold and formed by a metal mold press forming process or a rubber press forming process. Furthermore, after the formed part thus obtained is dewaxed in vacuum atmosphere or inert gas atmosphere, the formed part is fired at a firing temperature of 1600° to 1800° C., and finally subjected to a grinding process or the like. The wafer holding member made of a blackened aluminum nitride based sintered body can thus be obtained.

Since the wafer holding member in accordance with the first invention is made of a blackened aluminum nitride based sintered body as described above, the absorption ratio of the light of wavelengths of 200 to 2000 nm emitted from the halogen lamps can be raised to 60% or more. Besides, since the thermal conductivity is 150 W/m.k or more, when a wafer such as a semiconductor wafer or a glass substrate for LCD is placed on the mounting surface and heated by the halogen lamps, the wafer can be heated to the temperature required for film forming in a short period and the whole of the wafer can be heated uniformly.

Furthermore, the aluminum nitride based sintered body constituting the wafer holding member in accordance with the first invention is added with $Er_2O_3$ as a sintering aid and is blackened by adding silicon. Since the amount of the silicon is within a predetermined range, etching due to a halogenated gas used as an atmosphere gas can be reduced significantly, and the wafer holding member can thus be used for an extended period of time.

<EXAMPLE 1: First invention>

An embodiment of the wafer holding member in accordance with the first invention is described below.

Figure 2:
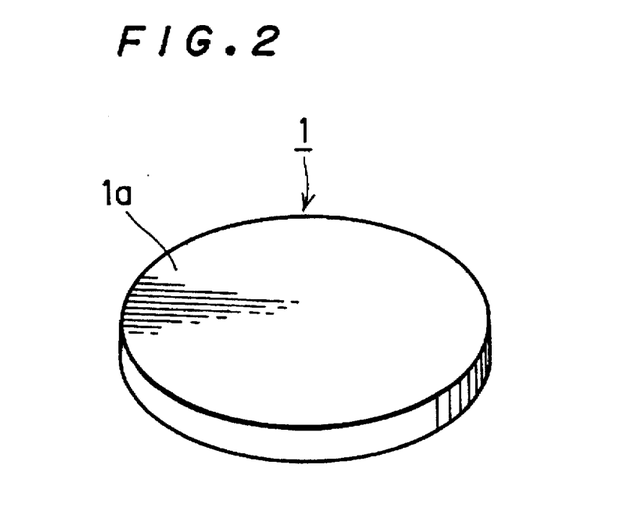
FIG. 2 is a perspective view showing only the susceptor shown in FIG. 1.

FIG. 1 is an explanatory view showing the method for forming a membrane thin film on a semiconductor wafer by using a susceptor 1 in accordance with an embodiment of the wafer holding member of the first invention. FIG. 2 is a perspective view showing only the susceptor 1 shown in FIG. 1. A semiconductor wafer 2 is placed on the top surface 1a of the susceptor 1 made of a disc-shaped, black-purple, aluminum nitride based sintered body supported by a support base 5, high-frequency voltage 7 is applied across a plasma lower electrode 4 disposed below the susceptor 1 and a plasma upper electrode 3 disposed above the susceptor 1 to generate plasma, and a film forming gas is supplied. The semiconductor wafer 2 placed on the top surface 11 of the susceptor 1 is then heated indirectly by a group of halogen lamps 6 to form a film.

Furthermore, to produce the susceptor 1, AlN powder including about 40 ppm of silicon and having a purity of 99% or more and an average particle diameter of about 1.2 μm is mixed with $Er_2O_3$ used as a sintering aid at a weight ratio of 94:6, and is further added with a solvent, and then crushed by $Si_3N_4$ balls for about 10 hours. A binder amounting to about 2 weight % is added to the above-mentioned crushed material and the material is dried by a spray drier to form granules. The granules are charged into a cylindrical rubber mold and formed into a cylindrical body by a rubber press forming process. The cylindrical body is machined to form discs having a diameter of about 170 to 260 mm and a thickness of 7 to 12 mm. The formed disc is then dewaxed in nitrogen atmosphere, fired at a firing temperature of about 1700° C. in the nitrogen atmosphere and ground to obtain the susceptor 1 in accordance with the first invention as a disc having a diameter of about 150 to 200 mm and a thickness of 6 to 9 mm.

<Variation of Example 1 and Comparison Examples—Part 1>

Aluminum nitride based sintered bodies having various addition amounts of $Er_2O_3$ were prepared and their thermal conductivity values were measured depending on the content of $Er_2O_3$.

To produce these samples, AlN powder having a purity of 99%, an average particle diameter of about 1.5 μm and including about 400 ppm of silicon was mixed with $Er_2O_3$ powder having a purity of 99.9% and an average particle diameter of about 1.2 μm at weight ratios in the range of 91:9 to 97:3. A solvent was further added and these mixtures were crushed by $Si_3N_4$ balls for 10 hours. Furthermore, the mixtures were added with 2 weight % of a binder and dried by a spray drier to form granules. The obtained granules were charged into a metal mold and formed into discs having a diameter of 10 mm and a thickness of about 3 mm. The discs were then dewaxed in nitrogen atmosphere and fired at a firing temperature of about 1780° C. in nitrogen atmosphere to obtain the samples.

<Test 1: First Invention>

By emitting laser pulse light to the samples and by measuring temperature rise values at the emitted surface and the surface opposite to the emitted surface, the maximum temperature of each sample at the time of laser emission was compared with that of a standard sapphire sample to calculate specific heat capacity. In addition, the ratio of diffusivity of heat was obtained on the basis of the time for reaching the half of the maximum temperature, and the thermal conductivity of each sample was obtained by using the laser-flash process wherein the value of specific heat capacity, the value of the ratio of diffusivity of heat and the density value of each sample were substituted into the equation described below.

Equation $K=\alpha \times Cp \times d$

K: Thermal conductivity
α: Ratio of diffusivity of heat
Cp: Specific heat capacity
d: Density In addition, since the thermal conductivity of the wafer holding member was required to be 150 W/m.k or more to uniformly heat the wafer, samples having a thermal conductivity of 150 W/m.k or more were judged to be superior in this test.

The test results of the samples are shown in Table 1.

TABLE 1

| Sample | Content of $Er_2O_3$ (wt %) | Content of Si (ppm) | Thermal conductivity (W/m · k) |
| --- | --- | --- | --- |
| *a | 3 | 200 | 108 |
| *b | 4 | 210 | 137 |
| c | 5 | 208 | 153 |
| d | 6 | 205 | 165.5 |
| e | 7 | 205 | 174 |
| f | 8 | 210 | 180 |
| g | 9 | 203 | 184 |

*indicates samples not corresponding to the first invention.

According to Table 1, it is understood that the thermal conductivity of the sintered body can be improved as the content of $Er_2O_3$ included in the aluminum nitride based sintered body increases. In the cases of samples a and b, since the content of $Er_2O_3$ included in the sintered body was less than 5 weight %, the thermal conductivity of the sintered body was unable to be raised to 150 W/m.k or more.

On the other hand, in the cases of samples c to g in accordance with the first invention, since the content of $Er_2O_3$ included in the sintered body was 5 weight % or more, the thermal conductivity of the sintered body was able to be raised to 150 W/m.k or more.

<Variation of Example 1 and Comparison Examples—Part 2>

Next, aluminum nitride based sintered bodies including various contents of silicon and Mo used as a coloring agent were prepared and the thermal conductivity values and lightness values of all the samples were measured.

To produce the samples, AlN powder having a purity of 99%, an average particle diameter of about 1.5 μm and about 400 ppm of silicon was mixed with $Er_2O_3$ powder having a purity of 99.9% and an average particle diameter of about 1.2 μm at a weight ratio of 94:6 and $MoO_3$ powder was added so as to obtain Mo contents of 0, 25, 50, 100 and 500 ppm respectively. These mixtures were crushed by $Si_3N_4$ balls together with a solvent for 10, 30 and 50 hours respectively. Furthermore, these mixtures were added with 2 weight % of a binder and dried by a spray drier to form granules. The obtained granules were charged into a metal mold and formed by a mechanical press into discs having a diameter of 60 mm and a thickness of 6 mm. The discs were then dewaxed in nitrogen atmosphere and fired at a firing temperature of about 1700° C. in nitrogen atmosphere, and finally ground to obtain discs having a thickness of 4 mm.

In addition, as other comparison examples, aluminum nitride based sintered bodies including 200 ppm or less of silicon and crushed by $Si_3N_4$ balls for about one hour and high-purity aluminum nitride based sintered bodies not including $Er_2O_3$ (sintering aid) were prepared.

<Test 2: First Invention>

Each samples was subjected to chemical quantitative analysis by using the ICP process to measure the contents of Mo and silicon included in the aluminum nitride based sintered body. The thermal conductivity of each sample was then measured by using the laser-flash process. The standard illuminant C was emitted to each sample and the lightness was measured by using a colorimeter (JIS Z 8729).

Furthermore, in this test, the aluminum nitride based sintered bodies having a thermal resistivity of 150 W/m.k or more and a lightness of 50 or less are judged to be superior.

The test results of the samples are shown in Table 2.

TABLE 2

| Sample | Content of $Er_2O_3$ (wt %) | Content of Mo (ppm) | Content of Si (ppm) | Crushing time (h) | Thermal conductivity (W/m · k) | Lightness |
| --- | --- | --- | --- | --- | --- | --- |
| *A | 6 | 0 | 200 | 10 | 175 | 58.3 |
| B | 6 | 25 | 210 |  | 170 | 49.0 |
| C | 6 | 50 | 208 |  | 160 | 40.7 |
| *D | 6 | 100 | 205 |  | 143 | 37.8 |
| *E | 6 | 500 | 205 |  | 140 | 38.8 |
| F | 6 | 0 | 470 | 30 | 168 | 49.8 |
| G | 6 | 25 | 455 |  | 160 | 43.8 |
| H | 6 | 50 | 460 |  | 152 | 40.3 |

TABLE 2-continued

| Sample | Content of $Er_2O_3$ (wt %) | Content of Mo (ppm) | Content of Si (ppm) | Crushing time (h) | Thermal conductivity (W/m · k) | Lightness |
|---|---|---|---|---|---|---|
| *I | 6 | 100 | 453 | | 144 | 38.2 |
| *J | 6 | 500 | 461 | | 138 | 38.6 |
| *K | 6 | 0 | 610 | 30 | 145 | 46.3 |
| *L | 6 | 25 | 610 | | 142 | 42.3 |
| *M | 6 | 50 | 610 | | 135 | 39.8 |
| *N | 6 | 100 | 610 | | 130 | 36.5 |
| *O | 6 | 500 | 612 | | 120 | 38.6 |
| *P | 6 | 25 | 80 | 1 | 170 | 56.0 |
| *Q | — | 0 | 220 | 10 | 80 | 80.4 |

*indicates samples not corresponding to the first invention.

As shown in Table 2, the content of silicon increased as the time of crushing by the $Si_3N_4$ balls was longer. In accordance with the increase in the content of silicon, the thermal conductivity of the aluminum nitride based sintered body decreased. The thermal conductivity values of samples K to P, that is, the group of samples subjected to crushing for the longest time, were less than 150 W/m.k, since the content of silicon was 500 ppm or more, that is, in the range of 610 to 612 ppm.

Furthermore, since samples D, E, I and J contained 50 ppm of Mo used as a coloring agent, the thermal conductivity values of the aluminum nitride based sintered bodies were less than 150 W/m.k, although their lightness values were all able to be lowered to less than 50.

Moreover, since the contents of silicon in samples A and P were 200 ppm or less, the thermal conductivity values of the aluminum nitride based sintered bodies were able to be raised to 150 W/m.k or more. However, the sintered bodies were not able to be blackened sufficiently and their lightness values was not able to be lowered to less than 50.

The lightness of the high-purity aluminum nitride based sintered body of sample Q was 80, that is, larger than 50, since $Er_2O_3$ was not added. In addition, the thermal conductivity of the sample was a small value of 80 W/m.k.

On the other hand, the aluminum nitride based sintered bodies of samples B, C, F, G and H in accordance with the first invention contain silicon in the range of more than 200 ppm to 500 ppm or less and also contain 50 ppm or less of Mo. Therefore, their thermal conductivity values were all 150 W/m.k or more and their lightness values were less than 50.

<TEST 3: First Invention>

In order to find the relationship between the lightness and the light absorption ratio of the aluminum nitride based sintered body, samples A, B, C, P and Q listed in Table 2 were heated by the halogen lamps, and their reflectivity and transmissivity were measured by using a spectrophotometer in the range of the light of the wavelengths of 200 to 2000 nm. The measured values were substituted into the equation shown below to obtain the absorption ratio.

Equation: Absorption ratio (%)=100−(reflectivity+transmissivity)

Figure 3:
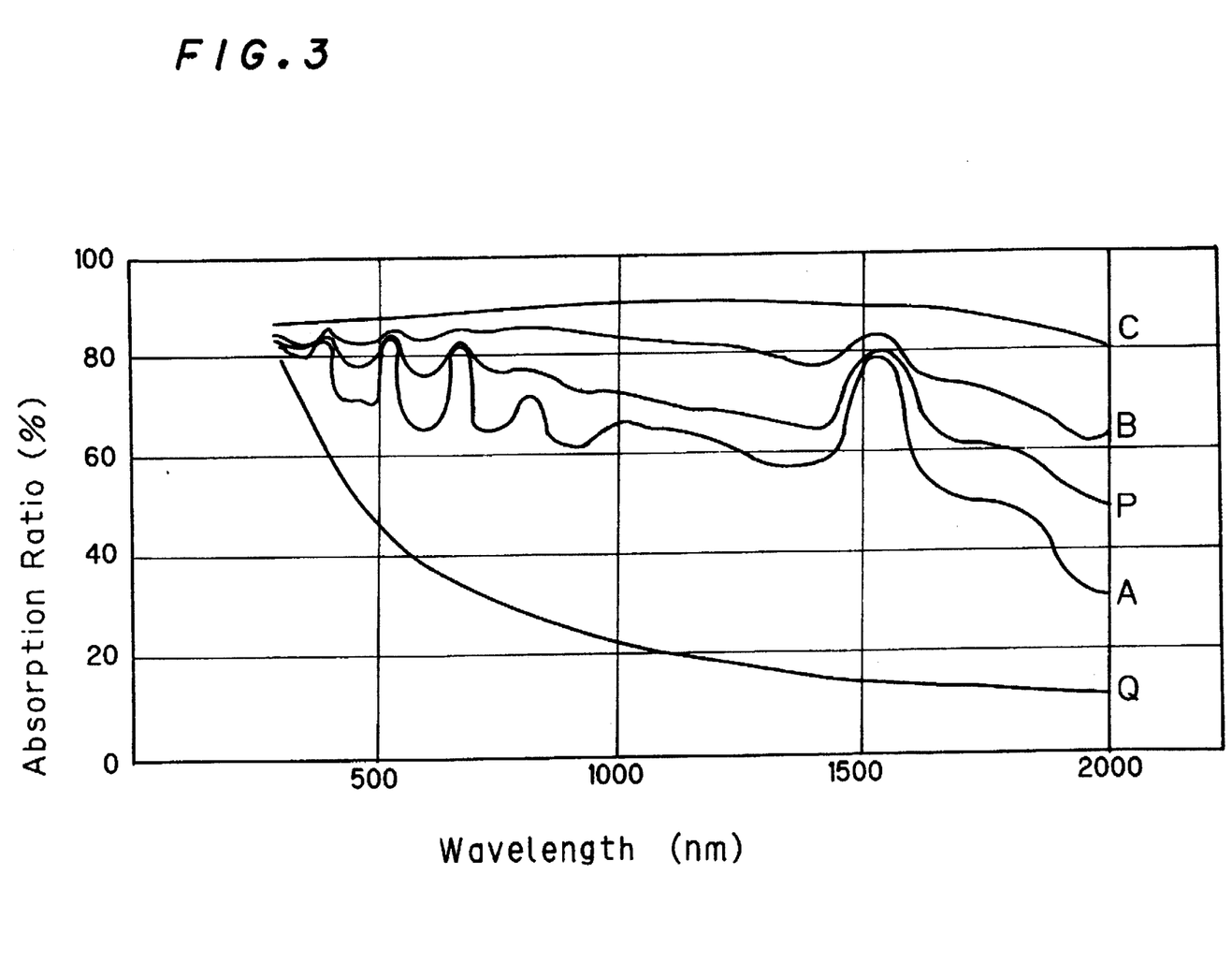
FIG. 3 is a graph showing a relationship between the lightness of an aluminum nitride based sintered body and the absorption ratio of the light of waveforms of 200 to 2000 nm.

The results are shown in FIG. 3.

As shown in FIG. 3, the absorption ratio of sample Q having the highest lightness of 80 was less than 60% in the range of the light of wavelengths of 400 to 2000 nm within the range of 200 to 2000 nm.

In addition, the absorption ratio of sample A having a lightness of 58.3 was less than 60% in the range of the light of wavelengths of 1600 to 2000 nm. The absorption ratio of sample P having a lightness of 56 was also less than 60% in the range of the light of wavelengths of 1800 to 2000 nm.

On the other hand, the absorption ratios of samples B and C in accordance with the first invention and having a lightness value of less than 50 were able to be raised to more than 60% in the light of all wavelengths of 200 to 2000 nm. In particular, the absorption ratio of sample C having a lightness of 40.7 were able to be raised to 80% or more in the light of all wavelengths of 200 to 2000 nm.

Furthermore, when the susceptor 1 was formed by using the aluminum nitride based sintered bodies made of samples B and C and film forming was performed as shown in FIG. 1, a film having a uniform thickness was able to be formed on the semiconductor wafer 2.

As described above, the wafer holding member in accordance with the first invention is made of an aluminum nitride based sintered body containing $ER_2O_3$ as a sintering aid and also containing silicon in the range of more than 200 ppm to 500 ppm or less and has a thermal conductivity of 150 W/m.k or more. The lightness of the sintered body can thus be lowered to 50 or less and the absorption ratio of the sintered body can be raised to 60% or more in the range of the light of all wavelengths of 200 to 2000 nm emitted from the halogen lamps. When a wafer such as a semiconductor wafer or a glass substrate for LCD is placed on the top surface of the wafer holding member and heated by the halogen lamps, the wafer can be heated uniformly to the predetermined temperature for a short time, thereby capable of performing accurate film forming. In addition, since the holding member is hardly etched by a halogenated gas used as an atmosphere gas, the holding member can be used for an extended period of time.

Just as the first invention, the second invention is intended to improve the heat absorption ratio during indirect heating. While the composition and physical properties of the aluminum nitride based sintered body are made inventive in the first invention, the new layer structure of the wafer holding member is made inventive in the second invention. More specifically, in addition to the fact that the second invention adopts the principle described before, the wafer holding member of the second invention comprises a holding base body made of an aluminum nitride based sintered body, a wafer mounting surface provided by one surface of the base body, a light absorbing surface provided by the other surface of the base body, and a heat absorbing layer embedded in the base body in the depth ranging from 10 to 1000 μm from the light absorbing surface of the base body, thereby obtaining a heat absorption ratio of 70% or more when the light absorbing surface of the base body is irradiated with the light of wavelengths of 200 to 2000 nm.

The above-mentioned heat absorbing layer comprises a heat transfer portion made of a kind of metal selected from molybdenum and nickel or an alloy of these metals and a heat absorbing portion made of an aluminum nitride based sintered body in which the above-mentioned metal component is diffused.

Furthermore, the above-mentioned heat absorbing layer comprises a heat transfer portion made of a kind of metal selected from tungsten, molybdenum and nickel or an alloy of these metals mixed with aluminum nitride and a heat absorbing portion made of an aluminum nitride based sintered body in which the above-mentioned metal component is diffused.

The embodiments in accordance with the second invention are described below.

<Example: Second Invention>

Figure 4:
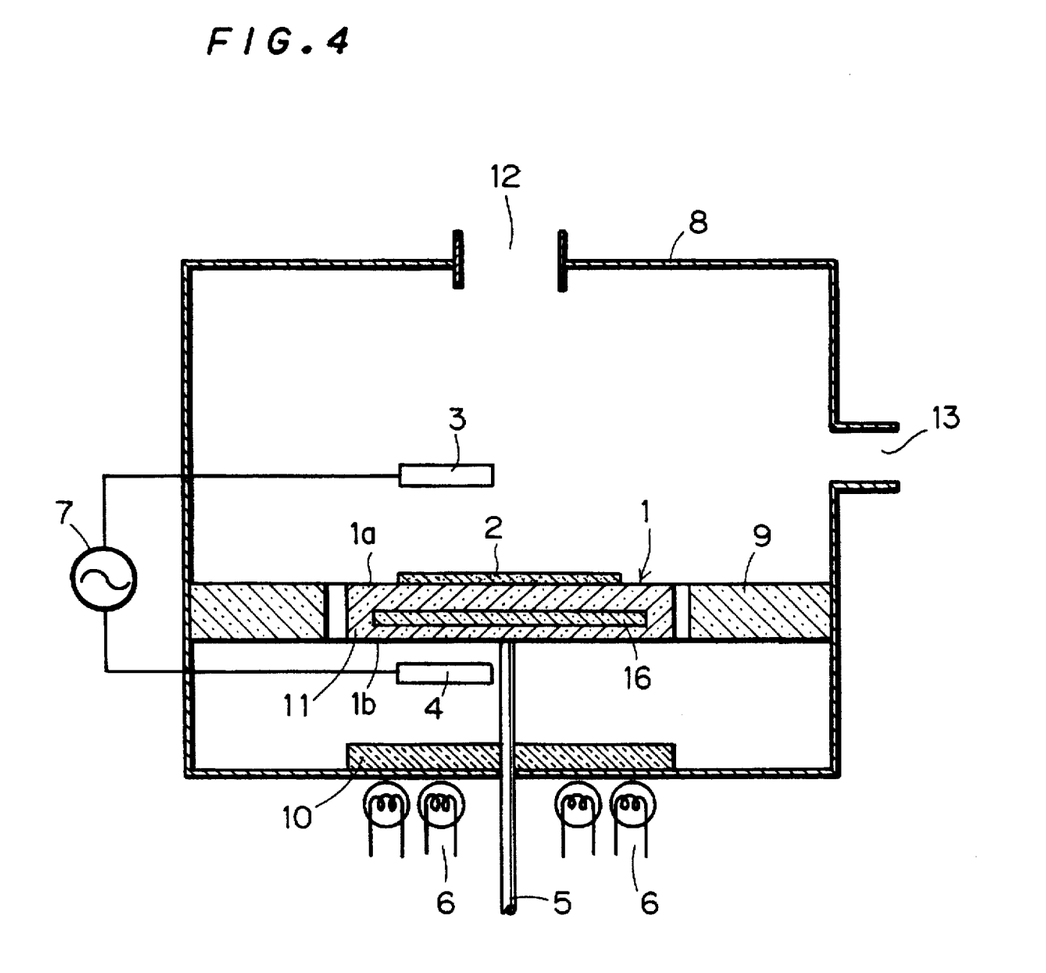
FIG. 4 is a schematic view showing a condition wherein a susceptor 1 in accordance with the second invention is built in the processing chamber of a CVD apparatus.

FIG. 4 is a schematic view showing a condition wherein a susceptor, an embodiment of the wafer holding member in accordance with the second invention, is housed in a CVD apparatus. The same reference numerals are used to designate the same members as those used in the first invention. The upper portion of the treatment chamber 8 of the apparatus is provided with a supply port 12 used to supply a film forming gas and an atmosphere gas. A side portion of the treatment chamber 8 is provided with a discharge port 13 used to discharge the film forming gas and atmosphere gas remaining in the treatment chamber 8.

A base body 11 made of an aluminum nitride based sintered body is disposed in the center of the treatment chamber 8. A susceptor 1 in which a heat absorbing layer 16 is embedded in the base body 11 is disposed by a support base 5. A guide ring 9 is disposed around the outer circumference of the susceptor 1 to prevent the film forming gas from going downward. A plasma upper electrode 3 is disposed above the susceptor 1 and a plasma lower electrode 4 is disposed below the susceptor 1. A clamp used to press a semiconductor wafer 2 is not shown in FIG. 4 to make the figure simple.

At the inner bottom of the treatment chamber 8, a window member 10 made of a light transmission material such as glass, sapphire, aluminum nitride based sintered body or alumina sintered body is provided and halogen lamps 6 are provided below the window member 10.

To form a thin film on the semiconductor wafer 2 (hereinafter referred to as "wafer") by using the CVD apparatus, the halogen lamps 6 are first turned on and the light of the halogen lamps 6 is gathered on the light absorbing surface 1b of the susceptor 1 via the window member 10 and the temperature of the susceptor 1 is raised to heat the wafer 2 disposed on the mounting surface 1a of the susceptor 1.

Since the base body 11 of the susceptor 1 is made of an aluminum nitride based sintered body, the light of the halogen lamps irradiated to the light absorbing surface 1b of the base body 11 passes through the base body 11 and is absorbed by the heat absorbing layer 16. The absorbed heat is immediately transferred to the whole of the susceptor 1 so as to uniformly heat the wafer 2 disposed on the mounting surface 1a to the predetermined temperature in a short period.

Next, high-frequency voltage 7 is applied across the plasma electrodes 3, 4 sandwiching the susceptor 1 therebetween to generate plasma, and a film forming gas and an atmosphere gas are supplied from the supply port 12. Since the wafer 2 has been heated to the predetermined temperature, the film forming gas is thermally discomposed and accumulates on the wafer 2 so as to form an accurate thin film on the wafer 2.

Since the ceramic guide ring 9 is disposed on the outer circumference of the susceptor 1, the film forming gas is prevented from going below the susceptor 1 so that the gas does not obstruct the light of the halogen lamps 6 irradiated to the light absorbing surface 1b of the susceptor 1.

The susceptor 1 in accordance with the second invention is further described below in detail.

Figure 5A:
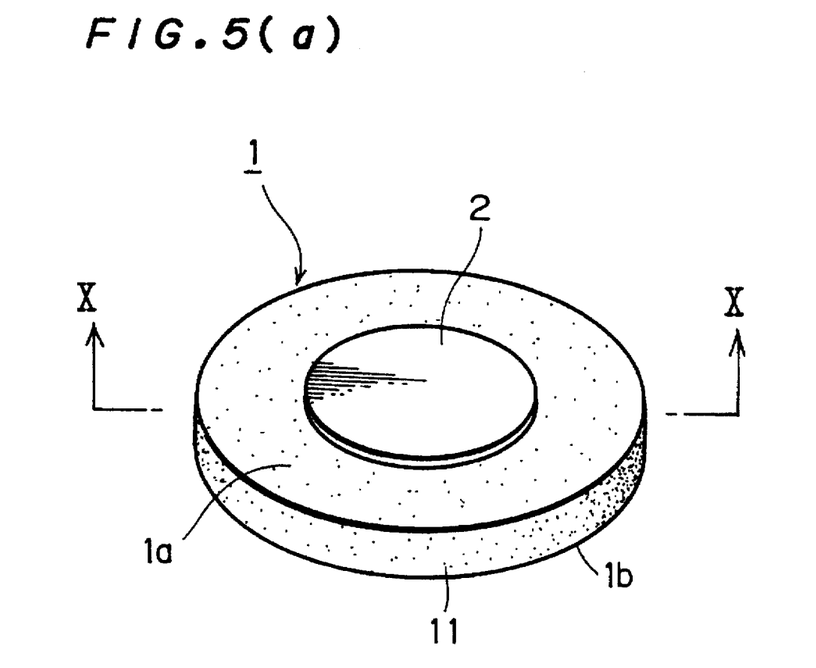
FIG. 5(a) is a perspective view of the susceptor 1 in accordance with the second invention and FIG. 5(b) is a sectional view taken on lines X—X of FIG. 5(a)
Figure 5B:
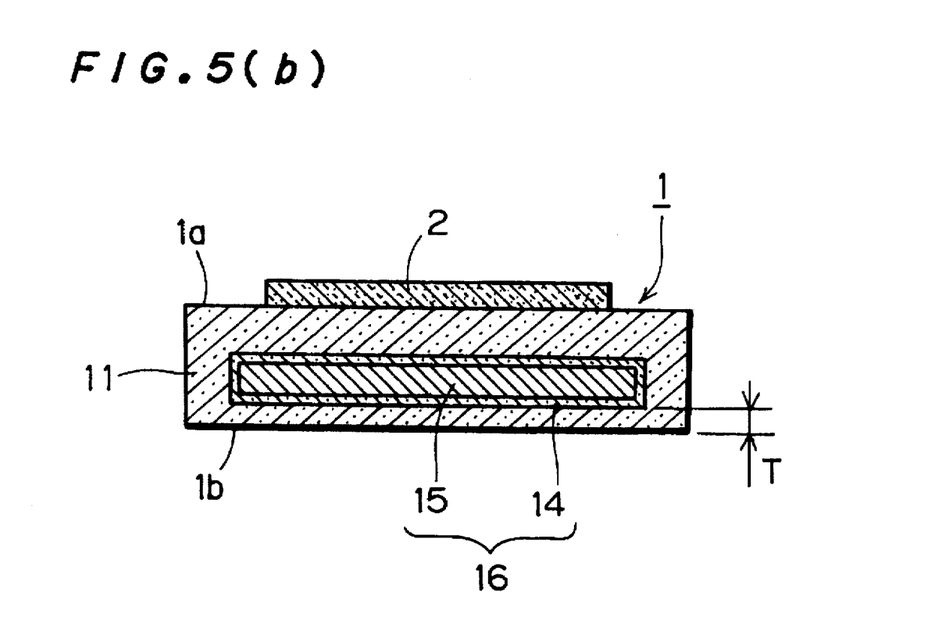

As shown in FIGS. 5(a) and 5(b), the susceptor 1 comprises the disc-shaped base body 11, the top surface of which is used as the mounting surface 1a for the wafer 2 and the bottom surface of which is used as the light absorbing surface 1b, and the base body 11 is made of an aluminum nitride based sintered body.

The heat absorbing layer 16 comprising a heat absorbing portion 14 for absorbing the light of the halogen lamps 6 passed through the light absorbing surface 1b and a heat transfer portion 15 for transferring the heat absorbed by the heat absorbing portion 14 to the whole of the base body 11 is embedded inside the base body 11. The heat absorbing portion 14 is provided to enclose the heat transfer portion 15.

The aluminum nitride based sintered body constituting the base body 11 should contain 99 weight % or more of AlN, preferably 99.5 weight % or more, more preferably 99.8 weight % or more. By using these sintered bodies, the base body 11 can have semi-transmissivity in a range where the thickness thereof is small, and can also have superior corrosion resistance, since the sintered body hardly forms grain boundary layers. In addition, since the base body 11 does not include components (impurities) harmful to the wafer 2, the wafer 2 is not contaminated.

For these reasons, by using the susceptor 1 in accordance with the second invention, the light from the halogen lamps 6 irradiated to the light absorbing surface 1b can pass through and can be absorbed by the heat absorbing layer 16, and the wafer 2 can be held accurately at all times without being affected adversely. In addition, since the above-mentioned high-purity aluminum nitride based sintered body has a thermal conductivity of 70 W/m.k or more, the heat absorbed by the heat absorbing layer 16 can be transferred uniformly and effectively to the wafer 2 so as to heat the wafer 2.

The aluminum nitride based sintered body constituting the base body 11 is not limited to the above-mentioned high-purity sintered body, but a sintered body added only with a rare earth element oxide, such as $Y_2O_3$, $Yb_2O_3$ or $Er_2O_3$, as a sintering aid may be used. In this way, the aluminum nitride based sintered body added only with a rare earth element oxide can retain semi-transmissivity in a range where the thickness thereof is small, and can have a high thermal conductivity of 70 to 190 W/m.k. As a result, the light of the halogen lamp 6 irradiated to the light absorbing surface 1b can pass through and be absorbed by the heat absorbing layer 16, and the heat absorbed by the above-mentioned heat absorbing layer 16 can be transferred more uniformly and effectively to the wafer 2. However, when the addition amount of the above-mentioned rare earth element oxide exceeds 9 weight %, numerous grain boundary layers are formed in the sintered body, and there is a greater fear of being etched by a halogenated corrosive gas used as an atmosphere gas. The addition amount of the rare earth element oxide should therefore preferably be 9 weight % or less.

Furthermore, to enhance the corrosion resistance of the aluminum nitride based sintered body in the halogenated corrosive gas used as an atmosphere gas, the content of silicon contained in the aluminum nitride based sintered body should be 1500 ppm or less, more preferably 1000 ppm or less. Moreover, the content of impurities, for example alkaline metals, alkaline earth metals and transition metals, such as Na, Ca, Fe, etc. which will contaminate the wafer 2 should preferably be 2000 ppm or less in total.

On the other hand, the heat transfer portion 15 of the heat absorbing layer 16 embedded in the base body 11 is made of a kind of metal selected from tungsten, molybdenum and nickel or an alloy of these metals, and the heat absorbing portion 14 is made of an aluminum nitride based sintered body in which the above-mentioned metal component is diffused.

More specifically, the heat absorbing portion 14 of the heat absorbing layer 16 is made of an aluminum nitride based sintered body in which a metal component of tungsten, molybdenum or nickel used to constitute the heat transfer portion 15 is diffused. The sintered body is thus black or nearly black and can effectively absorb the light of the halogen lamps 6 passed through the light absorbing surface 1b of the base body 11 can be absorbed effectively.

Additionally, since the heat transfer portion 15 continuously connected to the above-mentioned heat absorbing portion 14 is made of a kind of metal selected from tungsten, molybdenum and nickel or an alloy of these metals having high thermal conductivity (thermal conductivity: 90 to 180 W/m.k), the heat absorbed by the heat absorbing protection 14 can be transferred uniformly to the whole of the susceptor 1.

Besides, since the thermal expansion coefficient of the tungsten, molybdenum or nickel constituting the heat transfer portion 15 is 4 to $14\times10^{-6}/°$ C. and close to the thermal expansion coefficient (4.0 to $6.0\times10^{-6}/°$ C.) of the aluminum nitride based sintered body constituting the base body 11, the base body 11 and the heat absorbing layer 16 can be made contact closely and firmly with each other and cracks or the like are not caused between the base body 11 and the heat absorbing layer 16 even when the susceptor 1 is heated.

The above-mentioned heat transfer portion 15 can be made of aluminum nitride mixed with a kind of metal selected from tungsten, molybdenum and nickel or an alloy of these metals. In this case, since the difference in thermal expansion between the base body 11 and the heat absorbing layer 16 can be made smaller, the contact therebetween can be made firmer and closer.

In order to heat the wafer 2 to the predetermined temperature by absorbing the light from the halogen lamps 6, the heat absorption ratio of the light of wavelengths of 200 to 2000 nm at the susceptor 1 should preferably be 65% or more. To attain this, the heat absorbing layer 16 is required to be provided inside the base body 11 away from the light absorbing surface 1b of the base body 11 by 10 to 1000 μm.

In other words, if distance T from the heat absorbing layer 16 to the light absorbing surface 1b of the base body 11 is less than 10 μm, the heat absorbing layer 16 may be exposed during grinding. It is thus difficult to make the distance smaller. Conversely, if distance T from the heat absorbing layer 16 to the light absorbing surface 1b of the base body 11 is more than 1000 μm, the light from the halogen lamps 6 cannot reach the heat absorbing layer 16 and a heat absorption ratio of 65% or more cannot be attained.

Next, a method for producing the susceptor 1 in accordance with the second invention shown in FIG. 5 is described below.

First, AlN powder having a purity of 99% or more, containing silicon of 1500 ppm or less as an impurity and also containing alkaline metals, alkaline earth metals and transition metals of 2000 ppm or less as impurities is added and mixed with a binder and a solvent so as to obtain slurry. Alternatively, the above-mentioned AlN powder is added with more than one kind of rare earth element oxides such as $Y_2O_3$, $Yb_2O_3$ or $Er_2O_3$ as sintering aids in the range of 9 weight % or less and then added and mixed with a binder and a solvent so as to obtain slurry. Next, a plurality of green sheets having a thickness of about 0.5 mm are formed by the doctor-blade process. Powder made of one or two kinds of metals selected from tungsten, molybdenum and nickel having a specific surface area (BET) of 2 m²/g or more is added with a solvent to adjust the viscosity of the mixture and to form paste. The paste is then applied to the almost entire surface of one of the green sheets by the screen printing process. Alternatively, AlN powder is mixed with the above-mentioned metal powder and added with a solvent to adjust the viscosity of the mixture and to obtain paste. This paste may also be used as the paste to be applied to the green sheet. By using the paste including AlN powder in this way, the difference in thermal expansion between the paste and the aluminum nitride based sintered body constituting the base body 11 can be made smaller and the close contact strength therebetween can be enhanced. The mixture ratio of the above-mentioned powder made of one or two kinds of metals selected from tungsten, molybdenum and nickel and the AlN powder should preferably be in the range of 9:1 to 5:5.

A plurality of green sheets are then overlaid on the above-mentioned paste, pressed at a pressure of 50 kg/cm², formed into a disc by machining, subjected to vacuum dewaxing and fired in vacuum atmosphere or in nitrogen atmosphere at a firing temperature of about 2000° C. At this time, between the base body 11 and the heat transfer portion 15 made of a kind of metal selected from tungsten, molybdenum and nickel or an alloy of these metals, the heat absorbing portion 14 made of an aluminum nitride based sintered body in which the above-mentioned metal component is diffused is obtained. In other words, in the second invention, by overlaying the green sheets constituting the base body 11 on the paste constituting the heat transfer portion 15 and by sintering and forming them into one piece, the metal component in the heat transfer portion 15 can be diffused in the aluminum nitride based sintered body constituting the base body 11 and thus the heat absorbing portion 14 can be formed so as to cover the outer circumference of the heat transfer portion 15.

The top surface of the disc thus obtained is ground to form the mounting surface 1a. In addition, the bottom surface thereof is ground until distance T from the heat absorbing layer 16 is in the range of 10 to 1000 μm to form the light absorbing surface 1b. In this way, the susceptor 1 in accordance with the second invention can be obtained.

<Variation of Example 1 and Comparison Examples>

In the disc-shaped susceptor 1 approximately measuring 210 mm in diameter and 6 mm in thickness as shown in FIG. 5, the base body 11 thereof was made of an aluminum nitride based sintered body containing 99.6 weight % of AlN. Various samples of the susceptor 1 were made: samples in which distance T from the heat absorbing layer 16 to the light absorbing surface 1b of the base body 11 had various values and a sample in which the heat absorbing layer 16 was not embedded.

<Test 1: Second Invention>

The light of the halogen lamps was irradiated onto the susceptor 1 and the heat absorption ratio of the light of wavelengths of 200 to 2000 nm was measured with an infrared spectrophotometer.

The heat absorption ratio referred to in the present experiment is a value represented by the equation below.

Heat absorption ratio (%)=100−(reflectivity+transmissivity)

Samples having a heat absorption ratio of 65% or more for the above-mentioned light of wavelengths were judged to be superior.

The results are shown in Table 3.

TABLE 3

| Sample | No. | Distance T from heat absorbing layer to absorbing surface of base body (μm) | Heat absorption ratio (%) |
|---|---|---|---|
| Second Invention | 1 | 60 | 85 |
| | 2 | 80 | 85 |
| | 3 | 200 | 80 |
| | 4 | 600 | 72 |
| | 5 | 900 | 72 |
| Comparison example | 6 | 1500 | 50 |
| | 7 | — | 40 |

As shown in Table 3, sample No. 7, that is, the susceptor 1 in which the heat absorbing layer 16 was not embedded had a low heat absorption ratio of 40%.

Since the susceptor 1 of sample No. 6 had distance T from the heat absorbing layer 16 to the light absorbing surface 1b of the base body 11 of more than 1000 μm, the light of the halogen lamps was reflected or absorbed before the light reached the heat absorbing layer 16 and the heat absorption ratio was about 50% and was not able to attain 65% or more.

On the other hand, since in samples No. 1 to 5 in accordance with the second invention, distance T from the heat absorbing layer 16 to the light absorbing surface 1b of the base body 11 was in the range of 10 to 1000 μm, the heat absorption ratio was able to be raised to 65% or more. In particular, samples in which distance T from the heat absorbing layer 16 to the light absorbing surface 1b of the base body 11 was 200 μm or less were able to have a heat absorption ratio of 80% or more and efficient heat absorption was able to be attained.

Although the wafer holding member in accordance with the second Invention was explained only in the case wherein a semiconductor wafer was used, it is not necessary to mention that the wafer holding member can also be applied to wafers for glass substrates for LCD or the like.

As described above, in accordance with the second invention, one surface of the base body made of an aluminum nitride based sintered body is used as a wafer mounting surface and the other surface is used as a light absorbing surface. In addition, the heat absorbing layer is embedded in a depth of 10 to 1000 nm from the light absorbing surface to make a wafer holding member which has a heat absorption ratio of 65% or more when the light of wavelengths of 200 to 2000 nm is emitted to the light absorbing surface of the base body. With this structure, the wafer holding member is hardly corroded even when the mounting surface is exposed to a halogenated corrosive gas. The wafer holding member can thus accurately hold a wafer at all times. Furthermore, since the mounting surface hardly includes impurities which contaminate the wafer, the wafer is not adversely affected.

Furthermore, since the heat absorbing layer having superior heat absorption characteristic and high thermal conductivity is provided at a position away from a certain distance from the light absorbing surface in the base body made of an aluminum nitride based sintered body, the light of the halogen lamps can be absorbed efficiently.

In particular, since the above-mentioned heat absorbing layer is the heat absorbing portion comprising the heat transfer portion made of a kind of metal selected from tungsten, molybdenum and nickel, an alloy of the metals, or such metals added with aluminum nitride and the heat absorbing portion made of an aluminum nitride based sintered body wherein the above-mentioned metal component is diffused, the heat absorbed by the heat absorbing layer can be transferred efficiently to the whole of the wafer holding member and the close contact with the aluminum nitride based sintered body constituting the base body can be enhanced, thereby preventing cracks or the like from being caused between the hat absorbing layer and the base body even when the wafer holding member is heated to a high temperature.

Accordingly, the wafer disposed on the mounting surface can be held accurately by the susceptor in accordance with the second invention without adversely affecting the wafer, and the wafer can be heated uniformly to the predetermined temperature in a short time.

As mentioned before, the third invention is intended to solve the problem of the adhesion of a semiconductor wafer to the wafer holding member made of an aluminum nitride based sintered body because of static electricity generated when the holding member is used. The third invention for attaining this purpose relates to a wafer holding member comprising a holding base body made of an aluminum nitride based sintered body and a high resistance layer having a volume resistivity value higher than that of the aluminum nitride based sintered body used as the base material at the portion where the base body makes contact with a semiconductor wafer.

The above-mentioned high resistance layer is made of a material having a volume resistivity value of $10^{13} \Omega \cdot cm$ or more and this layer may be coated as a film or firmly fixed to other members. Furthermore, an alumina film formed by oxidizing the surface of the aluminum nitride based sintered body may be used.

Since the wafer holding member in accordance with the third invention is made of a high resistance layer at the portion making contact with the wafer, the adhesion caused by Johnsen-Rahbeck's force can be prevented and the wafer can be removed easily after processing.

Moreover, since the wafer holding member itself is made of an aluminum nitride based sintered body having high plasma resistance, the holding member is not etched by plasma, thereby capable of preventing the generation of particles.

<Example 1: Third Invention>

An example in accordance with the third invention and applied to a clamp ring is described below.

Figure 6:
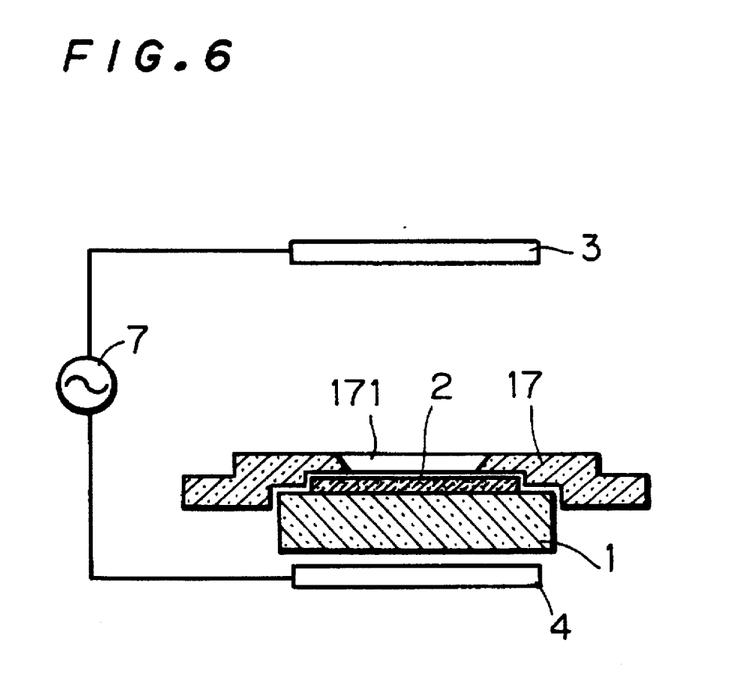
FIG. 6 is a schematic view showing a plasma etching apparatus using a clamp ring in accordance with an embodiment of the wafer holding member of the third invention.

FIG. 6 shows a schematic view of a plasma etching apparatus. A wafer 2 made of silicon or the like is mounted on a susceptor 1 and the end portion of the wafer 2 is pressed and secured by a clamp ring 17. Plasma is generated by applying high-frequency voltage 7 across a plasma lower electrode 4 provided below the susceptor 1 and a plasma upper electrode 3 provided above the susceptor 1 to perform plasma etching on the wafer 2.

Figure 7:
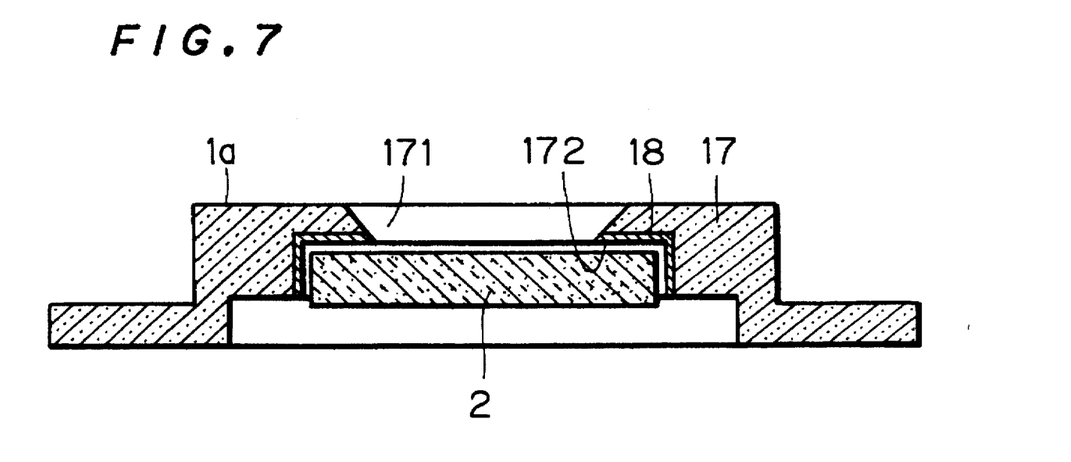
FIG. 7 is a sectional view showing a clamp ring in accordance with the embodiment of the wafer holding member of the third invention.

Furthermore, according to the detailed view shown in FIG. 7, the clamp ring 17 is a disc having a through hole 171 in the center thereof and a step portion 172 is provided around the through hole 171. This step portion 172 presses the end portion of the wafer 2 to secure it. The clamp ring 17 is made of an aluminum nitride based sintered body as a whole and only the surface of the step portion 172 has a high resistance layer 18.

When the clamp ring 17 is used, the top surface 1a is exposed to plasma. However, since the clamp ring 17 is made of an aluminum nitride based sintered body superior in plasma resistance, corrosion due to plasma can be prevented and the clamp ring 17 can be used for an extended period of time without causing the generation of particles. In addition, since the step portion 172 making contact with the wafer 2 is the high resistance layer 18, adhesion due to Johnsen-Rahbeck's force can be prevented and the wafer 2 can be removed easily after processing.

The above-mentioned high resistance layer 18 is made of a material having a volume resistivity value higher than that of the aluminum nitride based sintered body used as the base material to prevent adhesion due to Johnsen-Rahbeck's force generated on the basis of leak current. In particular, when a material having a volume resistivity value of $10^{13}\Omega\cdot cm$ or more at a temperature during usage is used, the adhesion force due to Johnsen-Rahbeck's force can be eliminated. An aluminum compound should preferably be used to have resistance against plasma. In consideration of these matters, $Al_2O_3$, AlN or AlF is used for the high resistance layer 18. When the temperature during usage is low, AlN can be used for the high resistance layer 18. In this case, however, a material having a volume resistivity value higher than that of the base material is used.

The film forming material described above may be attached or coated to a predetermined position by a known process, such as the CVD or PVD process, to obtain the high resistance layer 18.

Alternatively, when the aluminum nitride based sintered body used as the base material is subjected to oxidation, AlN on the surface of the sintered body is oxidized and an $Al_2O_3$ film can be formed. In this case, after the clamp ring 17 made of an aluminum nitride based sintered body is oxidized to form an $Al_2O_3$ film on the entire surface, the surfaces other than the surface of the step portion 172 are ground to remove the $Al_2O_3$ film, thereby capable of obtaining the clamp ring 17 having an $Al_2O_3$ layer as the high resistance layer 18 only on the step portion 172.

When the high resistance layer 18 is made of a film as described above, the thickness of the film should preferably be in the range of 2 to 30 µm. If the thickness is less than 2 µm, it is difficult to make the thickness of the film uniform, and if the thickness is more than 30 µm, the film may fall off because of difference in thermal expansion. The thickness should more preferably be in the range of 5 to 15 µm.

Furthermore, a sintered surface member (not shown) made of the above-mentioned $Al_2O_3$, AlN or AlF, separately formed and fired can be firmly secured by adhesion or the like to obtain the high resistance layer 18. In this case, the thickness of the high resistance layer 18 should be 2 µm or more, and should more preferably be 1 mm or more.

The aluminum nitride based sintered body constituting the clamp ring 17 includes a sintering aid, such as $Y_2O_3$, $Yb_2O_3$ or $Er_2O_3$. The sintered body is superior in plasma resistance and is also superior in heat radiation because of very high heat conductivity. Furthermore, a high-purity aluminum nitride based sintered body including 99 weight % or more of AlN, or more preferably 99.9 weight % or more without adding any sintering aid can be used to prevent the wafer 2 from being contaminated and to enhance the plasma resistance.

Although the clamp ring 17 is described in the above embodiment, the wafer holding member in accordance with the third invention is not limited to the clamp ring 17. The susceptor 1 shown in FIG. 6 can be made of an aluminum nitride based sintered body and a high resistance layer can be formed on the top surface thereof. Alternatively, the third invention can be applied to a handling arm for transferring a wafer and to other members making contact with and holding the wafer.

<Variation of Example 1 and Comparison Examples—Part 1>

A disk-shaped aluminum nitride based sintered body fired in nitrogen atmosphere was oxidized for 3 hours at 900 to 1300° C. in the atmosphere to form an $Al_2O_3$ film of 2 to 20 µm in thickness on the surface of the sintered body. The surfaces other than the wafer contacting surface were ground by a diamond grinder to remove the $Al_2O_3$ film. As a result, the clamp ring 17 having the $Al_2O_3$ film was obtained as the high resistance layer 18 only at the step portion 172.

<Test 1: Third Invention>

The clamp ring 17 was used in $CF_4$ gas atmosphere at 100° C. in a plasma etching apparatus in a semiconductor production process, and the adhesion force between the wafer 2 and the clamp ring 17 was examined after the process. The volume resistivity value of the $Al_2O_3$ film at 100° C. is $10^{15}\Omega\cdot cm$.

The results are shown in Table 4. When the $Al_2O_3$ film was not provided, a wafer adhesion force of 1 $g/cm^2$ or more was caused and it was difficult to remove the wafer 2. On the other hand, the clamp ring 17 provided with an $Al_2O_3$ film of 2 µm or more in thickness had lower wafer adhesion force, and it was found that the wafer 2 was able to be removed easily. This is understood that leak current hardly occurred because of the high volume resistivity of the $Al_2O_3$ layer as described above and that the adhesion force due to Johnsen-Rahbeck's force was not generated.

TABLE 4

| Oxidation temperature (°C.) | No oxidation | 900 | 1100 | 1200 | 1300 |
|---|---|---|---|---|---|
| $Al_2O_3$ film thickness (µm) | 0 | 0 | 2 | 10 | 20 |
| Wafer adhesion occurred/ not occurred | Occurred | Occurred | Occurred | Not occurred | Not occurred |
| Wafer adhesion force ($g/cm^2$) | >0.1 | >0.1 | >0.05 | 0.0 | 0.0 |

<Variation of Example 1 and Comparison Examples—Part 2>

An AlN film of 10 µm in thickness was formed by the CVD process on the step portion 172 of the clamp ring 17 shown in FIG. 7 to obtain the high resistance layer 18. The relationship between the volume resistivity value during usage and the wafer adhesion force was examined in variously changed film forming conditions and at variously changed temperatures during the usage of the obtained film.

<Test 2: Third Invention>

The samples were evaluated just as in Test 1 and the results of the test are shown in Table 5. According to the results, it is understood that the adhesion of the wafer 2 occurs when the volume resistivity value of the $Al_2O_3$ layer is a low value of $10^{11}\Omega\cdot cm$ and that wafer adhesion can be prevented when the volume resistivity value is $10^{13}\Omega\cdot cm$ or more.

TABLE 5

| Volume resistivity (Ω · cm) | $10^{18}$ | $10^{16}$ | $10^{14}$ | $10^{11}$ |
|---|---|---|---|---|
| Wafer adhesion occurred/not occurred | Not occurred | Not occurred | Occurred | Occurred |
| Wafer adhesion force (g/cm$^2$) | 0.0 | 0.0 | >0.05 | >0.1 |

<Variation of Example 1 and comparison Examples—Part 3: Third Invention>

Next, the clamp ring 17 in accordance with the third invention was produced by attaching an aluminum nitride based sintered body of 2 mm in thickness as the high resistance layer 18 by using epoxy resin. The clamp ring 17 was evaluated in the same way as described above. It was found that the adhesion of the wafer 2 did not occur and that the adhesion force was 0 g/cm$^2$.

As described above, in accordance with the third invention, the wafer holding member is made of an aluminum nitride based sintered body and a high resistance layer having a volume resistivity value higher than that of the aluminum nitride based sintered body used as the base material is provided at the portion making contact with the semiconductor wafer. Since the wafer contacting portion is composed of the high resistance layer, the static electricity adhesion due to Johnsen-Rahbeck's force can be prevented and the wafer can be removed easily after processing. For this reason, the wafer processing capability can be improved and the mixture of impurities can be prevented.

Furthermore, since the base material of the wafer holding member is made of an aluminum nitride based sintered body, the wafer holding member is superior in plasma resistance and can be used successfully for an extended period of time without generating particles. Moreover, the wafer holding member is superior in heat radiation. In this way, the present invention can offer the wafer holding member having a variety of features.

We claim:

1. A wafer holding member comprising:

an aluminum nitride based sintered body containing $Er_2O_3$ as a sintering aid and silicon in a range of between about 200 ppm and 500 ppm and having a thermal conductivity of not less than about 150 W/m.k.

2. The wafer holding member of claim 1, wherein the aluminum nitride sintered body contains $Er_2O_3$ in an amount of about 5 to 9 weight %.

3. The wafer holding member of claim 1, wherein the aluminum nitride based sintered body has a lightness of not greater than about 50.

4. The wafer holding member of claim 1, comprising at least one of Mo and W as a coloring agent.

5. The wafer holding member of claim 1, comprising at least one of CaO and MgO in an amount of not greater than about 1 weight %.

* * * * *